United States Patent
Jang et al.

(10) Patent No.: US 10,681,647 B2
(45) Date of Patent: Jun. 9, 2020

(54) METHOD AND APPARATUS FOR ADJUSTING TRANSMISSION POWER

(71) Applicant: Samsung Electronics Co., Ltd., Suwon-si, Gyeonggi-do (KR)

(72) Inventors: Chulhee Jang, Seoul (KR); Eunyong Kim, Yongin-si (KR); Joseph Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/822,031

(22) Filed: Nov. 24, 2017

(65) Prior Publication Data

US 2018/0152899 A1  May 31, 2018

(30) Foreign Application Priority Data

Nov. 28, 2016  (KR) .......................... 10-2016-0159601

(51) Int. Cl.
*H04W 52/24* (2009.01)
*H04W 52/26* (2009.01)
(Continued)

(52) U.S. Cl.
CPC .......... *H04W 52/241* (2013.01); *H04L 5/005* (2013.01); *H04L 5/0048* (2013.01);
(Continued)

(58) Field of Classification Search
CPC ............. H04W 28/0236; H04W 24/10; H04W 52/146; H04W 52/143; H04B 17/309
See application file for complete search history.

(56) References Cited

U.S. PATENT DOCUMENTS 9,161,236 B2 * 10/2015 Seo ...................... H04L 5/0073
9,648,569 B2 *  5/2017 Madan ................ H04W 52/146
(Continued)

FOREIGN PATENT DOCUMENTS

EP          1717965 A1    11/2006
KR    10-2012-0034509 A    4/2012
(Continued)

OTHER PUBLICATIONS

Extended European Search Report dated Sep. 3, 2019, issued in a counterpart European application No. 17874599.8-1219 / 3520506.

*Primary Examiner* — Ayaz R Sheikh
*Assistant Examiner* — Debebe A Asefa
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A transmission control method and a central management apparatus for performing the method are provided. The method includes receiving transmission control-related information from a base station, determining transmission power of at least one base station and the transmission point of a user equipment based on the transmission control-related information, and transmitting information about the determined transmission power and transmission point of the user equipment to the at least one base station. Furthermore, a base station adjusting transmission power and an
(Continued)

operation method of the base station may be controlled under the control of the central management apparatus.

16 Claims, 9 Drawing Sheets

(51) Int. Cl.
*H04L 5/00* (2006.01)
*H04W 52/38* (2009.01)
*H04W 76/27* (2018.01)
*H04W 52/14* (2009.01)
*H04W 72/04* (2009.01)
*H04W 72/08* (2009.01)
*H04W 52/22* (2009.01)
*H04W 52/28* (2009.01)
*H04W 88/08* (2009.01)

(52) U.S. Cl.
CPC ....... *H04W 52/143* (2013.01); *H04W 52/245* (2013.01); *H04W 52/267* (2013.01); *H04W 52/386* (2013.01); *H04W 72/0473* (2013.01); *H04W 72/085* (2013.01); *H04W 76/27* (2018.02); *H04L 5/0035* (2013.01); *H04W 52/223* (2013.01); *H04W 52/286* (2013.01); *H04W 88/08* (2013.01)

(56) References Cited

U.S. PATENT DOCUMENTS

| | | | |
|---|---|---|---|
| 2003/0223429 A1* | 12/2003 | Bi | H04L 47/11 370/395.4 |
| 2006/0146750 A1 | 7/2006 | Chen et al. | |
| 2006/0246939 A1 | 11/2006 | Zeller et al. | |
| 2011/0122970 A1* | 5/2011 | Chappaz | H04L 27/2017 375/308 |
| 2012/0083309 A1 | 4/2012 | Kwon et al. | |
| 2012/0120806 A1 | 5/2012 | Jeon et al. | |
| 2014/0148181 A1 | 5/2014 | Lee et al. | |
| 2015/0208361 A1 | 7/2015 | Kim et al. | |
| 2015/0237547 A1 | 8/2015 | Martinez et al. | |
| 2015/0319705 A1 | 11/2015 | Yoon et al. | |
| 2016/0219596 A1 | 7/2016 | Yanover et al. | |

FOREIGN PATENT DOCUMENTS

| | | |
|---|---|---|
| KR | 10-2012-0053148 A | 5/2012 |
| WO | 2006/073763 A2 | 7/2006 |

* cited by examiner

METHOD AND APPARATUS FOR ADJUSTING TRANSMISSION POWER

CROSS-REFERENCE TO RELATED APPLICATION(S)

This application claims the benefit under 35 U.S.C. § 119(a) of a Korean patent application filed on Nov. 28, 2016 in the Korean Intellectual Property Office and assigned Serial number 10-2016-0159601, the entire disclosure of which is hereby incorporated by reference.

TECHNICAL FIELD

The present disclosure relates to a method and an apparatus for adjusting transmission power in a mobile communication system. More particularly, the present disclosure relates to a method and an apparatus for adjusting the transmission power of a base station in a mobile communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, a mobile communication system was developed to provide a voice service while guaranteeing the activity of a user. However, the mobile communication system has gradually expanded its scope to a data service in addition to the voice service and has recently developed to the extent that it can provide a high-speed data service. Unlike in the voice service, in the data service, resources that can be allocated are determined depending on the amount of data to be transmitted and a channel situation. Accordingly, in a wireless communication system, such as a mobile communication system, management, such as that a scheduler allocates transmission resources by taking into consideration the amount of resources to be transmitted, a channel situation and the amount of data, is performed.

In order to increase the throughput of a user equipment (UE), a base station (BS) may control coverage and a load by adjusting the transmission power of the BS. In a technology of the related art, when the transmission power of a BS is adjusted, the transmission power of a reference signal (e.g., a common reference signal (CRS) and channel state information-reference signal (CSI-RS) of long-term evolution (LTE) and CSI-RS of a fifth generation (5G) system) related to coverage of a cell in addition to data transmission power was also adjusted. This method is suitable for the adjustment of load balancing between cells and channel quality of a UE, thereby being capable of improving the throughput of the UE. If the technology is applied of the related art, however, power for transmitting a reference signal related to coverage of a cell is also adjusted. Accordingly, handover of a UE may be generated because coverage of the cell is influenced. Accordingly, in order to prevent the frequent generation of handover, a transmission power adjustment period must be increased. In this case, the performance improvement of the UE is limited because channel information of the UE and a rapid change in transmission traffic are not properly incorporated. Furthermore, the range of transmission power adjustment is limited because a coverage hole may occur due to a change in the transmission power of a reference signal related to coverage of a cell.

Accordingly, there is a need for a transmission power adjustment method capable of preventing the frequent handover of a user, reducing the possibility that a coverage hole may occur, and also improve the throughput of a UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for adjusting transmission power in a mobile communication system. Furthermore, an object of the present disclosure is to provide a method and an apparatus for adjusting the transmission power of an enhanced node B (eNB) in a mobile communication system.

Furthermore, an object of the present disclosure is to provide a method and an apparatus for adjusting the real-time data transmission power and data transmission point of an eNB for maximizing the throughput performance metrics of a user equipment (UE).

In accordance with an aspect of the present disclosure, a transmission control method of a central management apparatus is provided. The method includes receiving transmission control-related information from at least one base station, determining transmission power of the at least one base station and the transmission point of a user equipment (UE) based on the transmission control-related information, and transmitting information about the determined transmission power and transmission point of the UE to the at least one base station.

In accordance with another embodiment of the present disclosure, a central management apparatus is provided. The apparatus includes a transceiver configured to transmit and receive signals and at least one processor configured to control receiving of transmission control-related information from at least one base station, determining of transmission power of the at least one base station and the transmission point of a UE based on the transmission control-related information, and transmitting of information about the determined transmission power and transmission point of the UE to the at least one base station.

In accordance with another aspect of the present disclosure, a method for at least one base station to adjust transmission power is provided. The method includes collecting transmission control-related information, transmitting the collected transmission control-related information to a central management apparatus, receiving information about the transmission power and information about a transmission point from the central management apparatus, and determining the transmission power for data based on the received information about the transmission power and determining a serving UE based on the received information about the transmission point.

In accordance with another aspect of the present disclosure, a base station is provided. The base station includes a transceiver configured to transmit and receive signals and at least one processor configured to control collecting of transmission control-related information, transmitting of the collected transmission control-related information to a central management apparatus, receiving of information about transmission power and information about a transmission point from the central management apparatus, determining of the transmission power for data based on the received information about the transmission power, and determining of a serving UE based on the received information about the transmission point.

Technical objects to be achieved by the present disclosure are not limited to the aforementioned objects, and those skilled in the art to which the present disclosure pertains may evidently understand other technological objects from the following description.

In accordance with another aspect of the present disclosure, a method and an apparatus for adjusting transmission power in a mobile communication system can be provided. Furthermore, in accordance with an aspect of the present disclosure, a method and an apparatus for adjusting the transmission power of an eNB in a mobile communication system can be provided.

Furthermore, in accordance with another aspect of the present disclosure, real-time data transmission power and a data transmission point can be adjusted in the state in which cell-specific reference signal (CRS) transmission power and a serving cell have been fixed. Accordingly, there is an effect in that real-time user equipment (UE) throughput performance in a commercial network can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
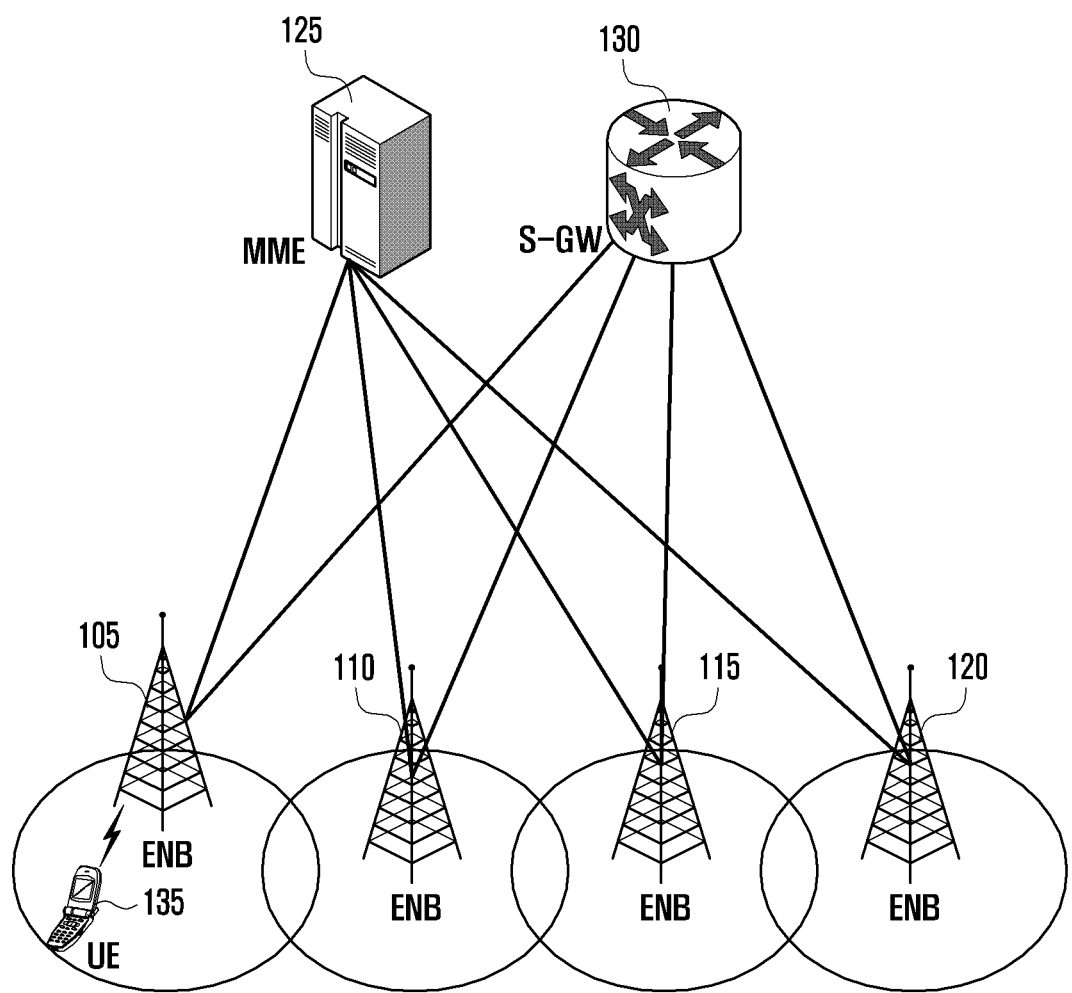
FIG. 1 is a diagram illustrating a configuration of a long-term evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, an operation in a long-term evolution (LTE) system is described as an example, for convenience of description. However, the embodiments of the present disclosure are not limited to the LTE system and may be applied to various communication systems capable of congested control through traffic management.

Hereinafter, in embodiments of the present disclosure, an enhanced node B (eNB) is the subject that performs the resource allocation of a user equipment (UE), and may be at least one of an eNode B, a Node B, a base station (BS), a fifth generation (5G) Node B, a radio access unit, a BS controller and a node in a network. A terminal may include a UE, a mobile station (MS), a cellular phone, a smartphone, a computer and a multimedia system capable of performing a communication function. In embodiments of the present disclosure, the downlink (DL) means the wireless transmission path of a signal transmitted from an eNB to a UE, and the uplink (UL) means the wireless transmission path of a signal transmitted from a UE to an eNB. Furthermore, hereinafter, the embodiments of the present disclosure are described by taking an LTE or LTE-A system as an example, but may be applied to other communication systems having a similar technical background or channel form. Furthermore, the embodiments of the present disclosure may also be applied to other communication systems through some modifications without greatly departing from the scope of the present disclosure based on a determination of those skilled in the art.

In embodiments of the present disclosure, a terminal may also be called a MS, a UE, a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile or other terms. Various embodiments of the UE may include a cellular phone, a smartphone having a wireless communication function, a personal digital assistant (PDA) having a wireless communication function, a wireless modem, a portable computer having a wireless communication function, a photographing apparatus, such as a digital camera having a wireless communication function, a gaming device having a wireless communication function, music storage and playback home appliances having a wireless communication function, a connected drive having a wireless communication function, mobile means having a wireless communication function, and Internet home appliances capable of wireless Internet access and browsing, and may also include portable units or terminals into which combinations of such functions are integrated.

In an embodiment of the present disclosure, download may mean the transmission of a data packet from an eNB to a UE, and upload may mean the transmission of a data packet from a UE to an eNB. A DL session and a download session may be used as the same meaning, and an UL session and an upload session may be used as the same meaning.

In an embodiment of the present disclosure, traffic may mean the amount of data that flows on a specific transmission path for a specific time. Furthermore, traffic may mean a load applied to a communication apparatus or system.

In an embodiment of the present disclosure, a transmission point may be construed as a serving eNB or serving cell for a UE.

FIG. 1 is a diagram illustrating a configuration of an LTE system according to an embodiment of the present disclosure.

Referring to FIG. 1, eNBs 105 to 120 correspond to the existing nodes B of a universal mobile telecommunication system (UMTS) system. The eNB is connected to a UE 135 through a radio channel and performs a more complicated role than the existing node B. In the LTE system, since all of types of user traffic including real-time service, such as voice over IP (VoIP) through an Internet protocol, is served through a shared channel, there is a need for an apparatus for performing scheduling by collecting state information, such as the buffer state, available transmission power state and channel state of UEs. The eNBs 105 to 120 are responsible for the role of the apparatus. In general, one eNB controls a plurality of cells. In order to implement a transfer rate of 100 Mbps, an LTE system uses orthogonal frequency division multiplexing (OFDM) as a radio access technology in a 20 MHz bandwidth. Furthermore, an adaptive modulation & coding (AMC) scheme for determining a modulation scheme and channel coding rate based on the channel state of a UE is applied to the LTE system. An S-GW 130 is an apparatus providing a data bearer, and generates or removes a data bearer under the control of an MME 125. The MME is an apparatus responsible for various control functions in addition to a mobility management function for a UE, and is connected to a plurality of eNBs.

Figure 2:
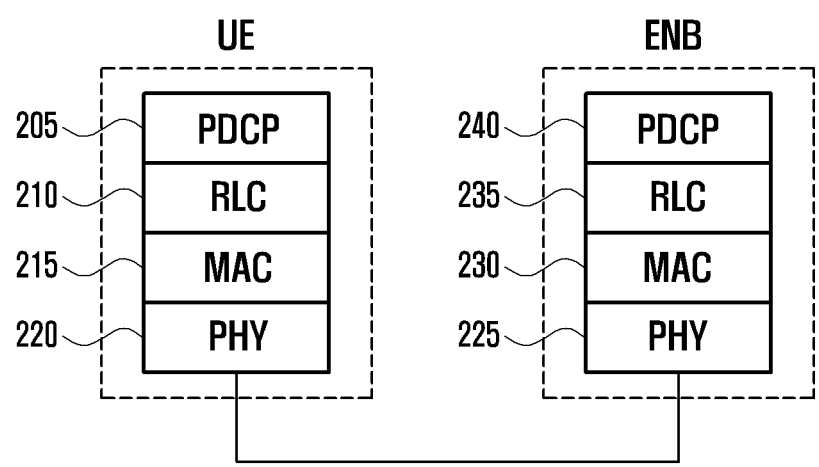
FIG. 2 is a diagram illustrating a radio protocol architecture in an LTE system according to an embodiment of the present disclosure.

FIG. 2 is a diagram illustrating a radio protocol architecture in an LTE system according to an embodiment of the present disclosure.

Referring to FIG. 2, the radio protocol of the LTE system includes packet data convergence protocols (PDCPs) 205 and 240, radio link control (RLC) 210 and 235, and medium access control (MAC) 215 and 230 in a UE and eNB, respectively. The PDCP 205, 240 is responsible for an operation, such as IP header compression/decompression. The RLC 210, 235 reconfigures a PDCP packet data unit (PDU) in a proper size. The MAC 215, 230 is connected to several RLC layer devices configured in one UE, and performs an operation of multiplexing RLC PDUs into an MAC PDU and demultiplexing RLC PDUs from an MAC PDU. A physical layer 220, 225 performs an operation of channel-coding and modulating high layer data into an OFDM symbol, transmitting the OFDM symbol to a radio channel or demodulating an OFDM symbol received through a radio channel, channel-decoding the demodulated symbol and transferring the demodulated symbol to a high layer. Furthermore, the physical layer also uses hybrid ARQ (HARQ) for additional error correction. A reception stage transmits whether a packet transmitted by a transmission stage has been received or not using 1 bit. This is called HARQ ACK/NACK information. DL HARQ ACK/NACK information for UL transmission may be transmitted through a physical hybrid-ARQ indicator channel (PHICH) physical channel. UL HARQ ACK/NACK information for DL transmission may be transmitted through a physical uplink control channel (PUCCH) or a physical uplink shared channel (PUSCH) physical channel.

Figure 3:
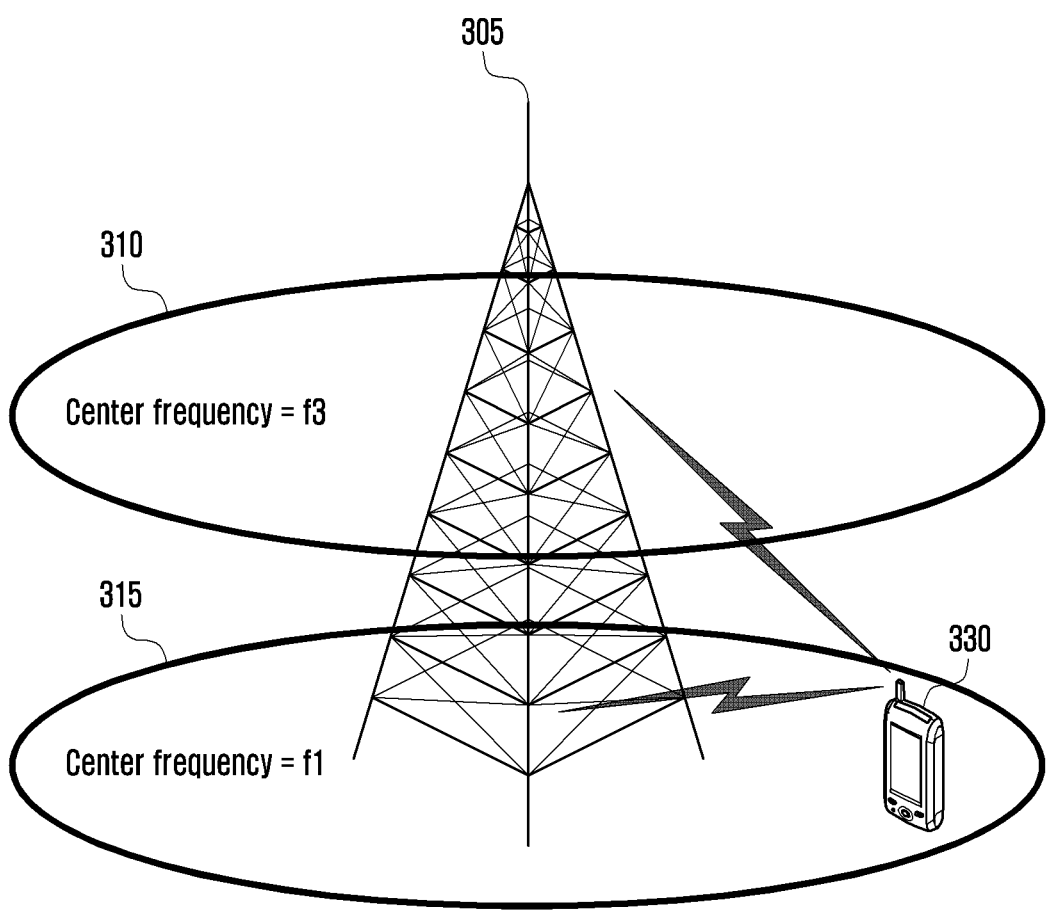
FIG. 3 is a diagram illustrating a carrier aggregation in a user equipment (UE) according to an embodiment of the present disclosure.

FIG. 3 is a diagram illustrating a carrier aggregation in a UE according to an embodiment of the present disclosure.

Referring to FIG. 3, in general, one eNB transmits and receives multiple carriers in several frequency bands. For example, in a technology of the related art, when an eNB 305 transmits a carrier 315 having a center frequency f1 and a carrier 310 having a center frequency f3, one UE transmits and receives data using one of the two carriers. However, a UE having a carrier aggregation capability can transmit and receive data to and from several carriers at the same time. The eNB 305 may allocate more carriers to a UE 330 having a carrier aggregation capability depending on a situation, thus being capable of improving the transfer rate of the UE 330.

In a traditional meaning, assuming that a single forward carrier and a single backward carrier transmitted and received by one eNB form a single cell, a carrier aggregation may be understood in which a UE transmits and receives data through several cells at the same time. Accordingly, a maximum transfer rate is increased in proportion to the number of aggregated carriers.

In describing embodiments of the present disclosure hereinafter, the meaning that a UE receives data through a specific forward carrier and transmits data through a specific backward carrier is the same as the meaning that the UE transmits and receives the data using a control channel and data channel provided by a cell corresponding to a center frequency and frequency band that characterize the carriers. Furthermore, the following embodiments of the present disclosure will be described based on the LTE system, for convenience of description, but may be applied to various wireless communication systems supporting a carrier aggregation.

Figure 4:
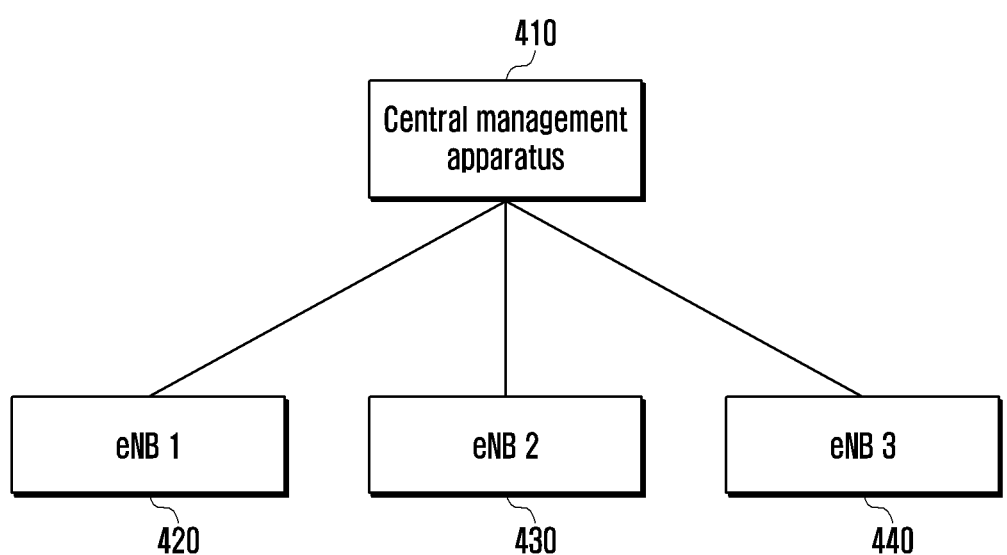
FIG. 4 is a diagram illustrating a relation between a central management apparatus and enhanced node Bs (eNBs) according to an embodiment of the present disclosure.

FIG. 4 is a diagram illustrating a relation between a central management apparatus and eNBs according to an embodiment of the present disclosure.

Referring to FIG. 4, a network may include a central management apparatus 410 and at least one eNB 420, 430, and 440. In an embodiment of the present disclosure, the central management apparatus 410 may be called a central unit. The central management apparatus 410 may be connected to the first eNB 420, the second eNB 430, and the third eNB 440. The eNBs may be connected through an X2 interface and may exchange information. The eNB may be called a transmission point (TP).

Hereinafter, it is assumed that an operation performed by an eNB is an operation performed by the first eNB 420, the second eNB 430, or the third eNB 440.

The eNB may collect information for transmission control. The transmission control may include at least one of data transmission power adjustment and transmission point adjustment. The data transmission power adjustment includes adjusting transmission power that is used for an eNB to transmit data. The transmission point adjustment includes determining an eNB that transmits data when the data is transmitted to a UE within a network. For example, the transmission point adjustment may include an operation of determining a UE to which data will be transmitted by the first eNB 420, a UE to which data will be transmitted by the second eNB 430, and a UE to which data will be transmitted by the third eNB 440. Information for transmission control is described below.

The eNB reports collected information for transmission control to the central management apparatus 410. The central management apparatus 410 receives information for transmission control from the eNB. The information collection and report may be performed depending on the configuration of the central management apparatus 410. For example, the central management apparatus 410 may determine information that must be collected by the eNB, a period and a report time and configure them in the eNB. The eNB may perform an information collection and report operation depending on the configuration of the central management apparatus 410.

The central management apparatus 410 may determine data transmission power of at least one eNB and the transmission point of a UE, belonging to coverage of the eNB managed by the central management apparatus 410, based on information received from the eNB. An embodiment of the present disclosure proposes a new method for the central management apparatus 410 to determine transmission power and a transmission point using received information.

If the central management apparatus 410 has determined transmission power and a transmission point, the central management apparatus 410 transmits the results of the determination to a corresponding eNB. Each eNB may determine data transmission power and/or a UE to be served by each eNB based on information received from the central management apparatus 410. Each eNB may transmit data to a determined UE using transmission power determined based on information received from the central management apparatus 410.

Figure 5:
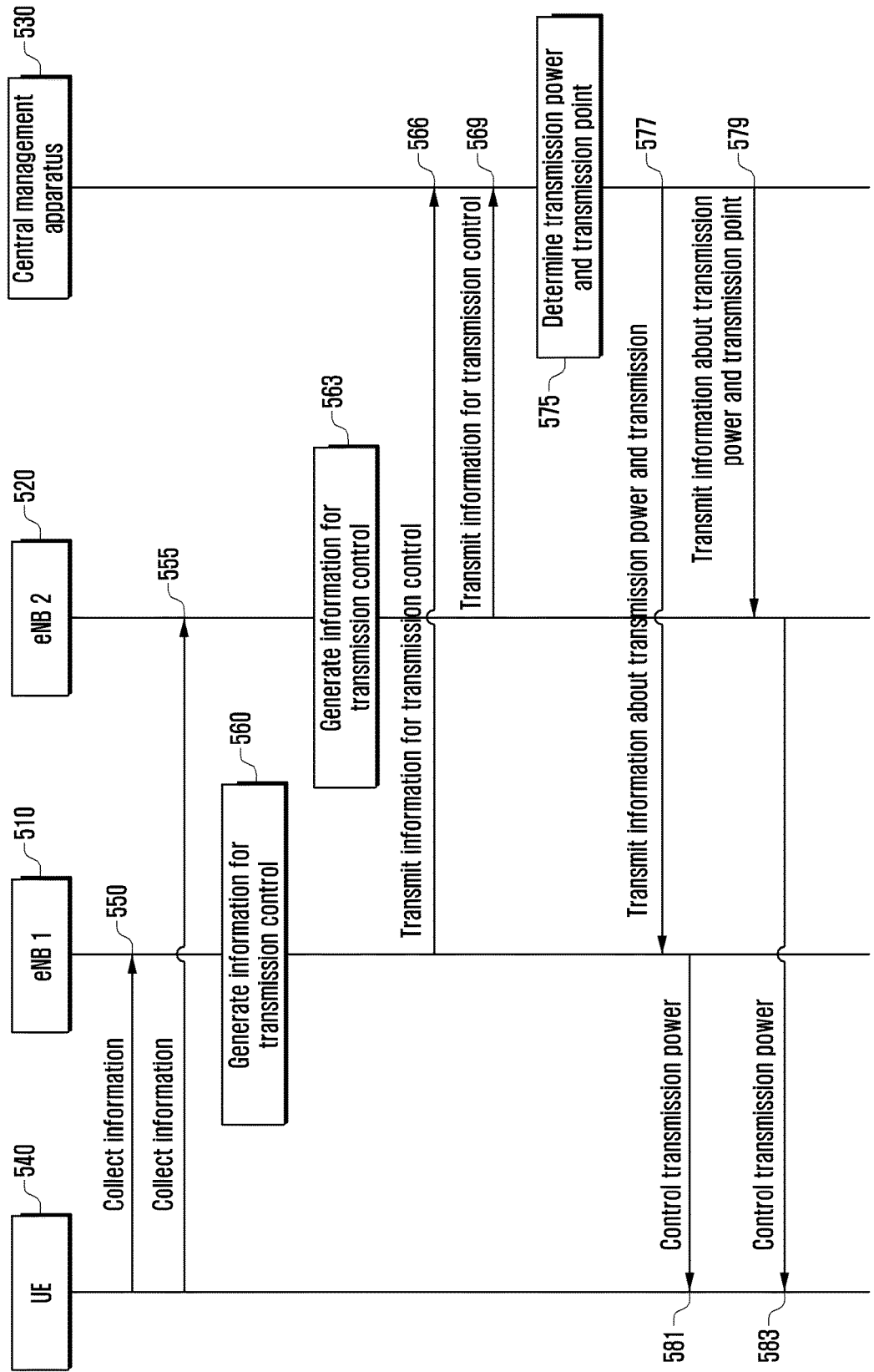
FIG. 5 is a diagram illustrating an operation of a network entity according to an embodiment of the present disclosure.

FIG. 5 is a diagram illustrating an operation of a network entity according to an embodiment of the present disclosure.

Referring to FIG. 5, at operation 550, an eNB 1 510 may collect information for transmission control from a UE 540. The information for transmission control may include information used to determine transmission power and information used to determine a transmission point. In FIG. 5, the UE 540 has been expressed as a single entity, but this is for convenience of description. A UE whose information is collected by the eNB 1 510 may be plural.

At operation 555, an eNB 2 520 may collect information for transmission control from the UE 540. In FIG. 5, the UE 540 has been expressed as a single entity, but this is for convenience of description. A UE whose information is collected by the eNB 2 520 may be plural. Furthermore, UEs whose information is collected by the eNB 1 510 and the eNB 2 520 may be different and may be partially the same. The information collected by the eNB 1 510 and the eNB 2 520 may be subsequently transferred to a central management apparatus 530. The central management apparatus 530 may determine transmission power of each eNB and a transmission point for each UE using a predetermined method or algorithm.

A method used by the eNB 1 510 and the eNB 2 520 in order to collect information and contents thereof are as follows.

The operation of the eNB 1 is described as an example because the operations of the eNB 1 510 and the eNB 2 520 are the same. The eNB 2 520 may perform the operation of the eNB 1 510.

The eNB 1 510 may perform a data collection period management, active UE list management and DL throughput management operation.

The eNB 1 510 manages a data collection period. The data collection period includes the period in which the eNB 1 510 collects information in a predetermined period. The data collection period may be previously configured by the central management apparatus 530. Furthermore, the data collection period may include the period in which collected information is reported. The eNB 1 510 may report collected information based on a predetermined period. Furthermore, the data collection period may include the period in which an active UE is determined and an active UE list is measured and reported.

The eNB 1 510 manages an active UE list. The eNB may manage the active UE list in a specific period. The eNB may store the active UE list in a specific period and report the stored information. In an embodiment of the present disclosure, the active UE list means a list of UEs that belong to UEs served by an eNB and that are in the active state. Furthermore, in an embodiment of the present disclosure, an active UE is newly defined. The active UE means a UE that is the state in which an eNB can now allocate resources to the UE (e.g., a radio resource control (RRC) connected state) and that has or had a DL transmission buffer capacity within a data collection period. In an embodiment of the present disclosure, an active UE is newly defined depending on the DL transmission buffer capacity of a UE. The reason why an active UE is newly defined is for managing UEs related to DL data transmission because in an embodiment of the present disclosure, transmission power adjustment for DL data transmission and a transmission point for a UE are described.

Figure 6:
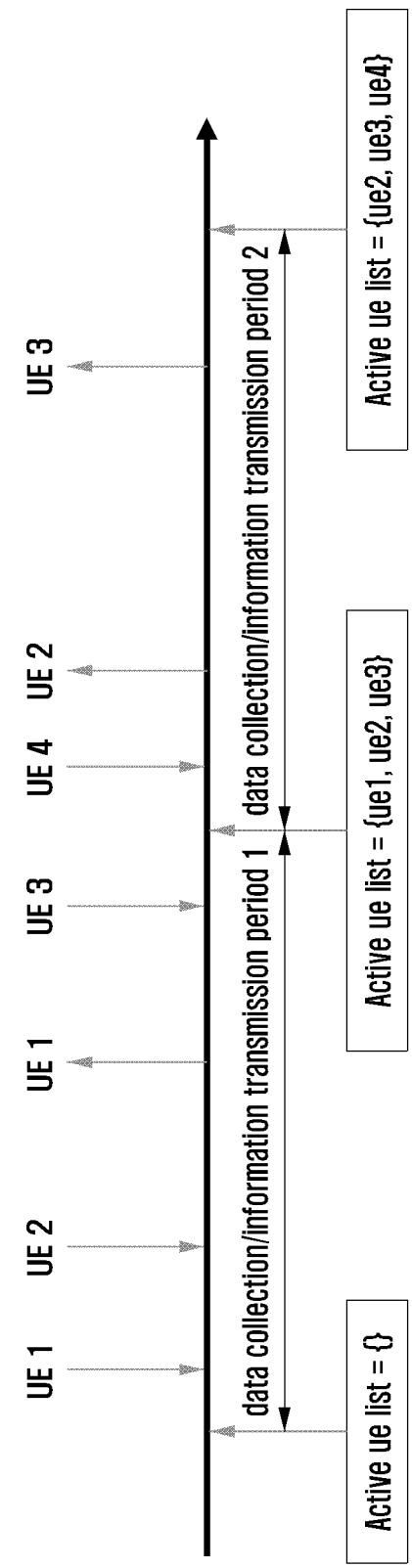
FIG. 6 is a diagram illustrating a method of managing active UEs according to an embodiment of the present disclosure.

FIG. 6 is a diagram illustrating a method of managing active UEs according to an embodiment of the present disclosure. In FIG. 6, it is assumed that all of UEs are the RRC connected state.

Referring to FIG. 6, an eNB collects data for determining an active UE during a data collection/information transmission period, and reports the results of the collection to the central management apparatus at the end of the period. In FIG. 6, a downward arrow means that the packet of a UE reaches the buffer of the eNB, and an upward arrow means that the buffer of the eNB for a corresponding UE has been empty.

For example, it may be seen that in a data collection/information transmission period 1, after the packet of a UE 1 reached the buffer, the buffer has been empty. A buffer capacity for the UE 1 is not present at the report time of the data collection/information transmission period 1, but the UE 1 corresponds to an active UE because the UE 1 had a DL transmission buffer capacity in the data collection/transmission period 1. A UE that performed data transmission has a good possibility that the UE may continuously transmit DL data. Accordingly, although a buffer for a UE has been temporarily empty at the report time, a UE that had a DL buffer in a data collection/information transmission period is managed as an active UE. A UE 2 and UE 3 correspond to active UEs because they have a DL transmission buffer capacity. Accordingly, at the end of the data collection/information transmission period 1, the eNB reports the UE 1, the UE 2 and the UE 3 as an active UE list.

In a data collection/information transmission period 2, a DL buffer for the UE 1 is not present. Accordingly, the UE 1 is not an active UE. A UE 4 corresponds to an active UE because the UE 4 has a DL buffer. Buffers for the UE 2 and the UE 3 have been empty in the data collection/information transmission period 2. However, the UE 2 and UE 3 correspond to active UEs because the buffers for the UE 2 and UE 3 were present and have been empty in the data collection/information transmission period 2. Accordingly, at the end of the data collection/information transmission period 2, the eNB reports the UE 2, the UE 3 and the UE 4 as an active UE list. The active UE list may be managed using such a method.

Referring back to FIG. 5, while the active UE list is managed, information about a change of an active UE list may be determined from the central management apparatus 530. In this case, the information about a change of the active UE list received from the central management apparatus 530 has precedence over an active UE list directly generated and managed by the eNB 1 510. For example, if the active UE list directly generated and managed by the eNB 1 510 and the active UE list received by the eNB 1 510 from the central management apparatus 530 are different, the eNB 1 510 applies the active UE list received from the central management apparatus 530. The reason for this is that the central management apparatus 530 can determine a UE to be served by each eNB (determines a transmission point) and in this case, the active list of UEs to be served by a corresponding eNB may be changed.

The eNB 1 510 may manage the throughput of a UE. Throughput managed by the eNB 1 510 may manage DL filtered perceived (DL FP) throughput. The DL FP throughput is hereinafter referred to as "DL FP throughput." The eNB 1 510 updates the DL FP throughput Tput$_i$ every subframe. A UE to be updated is a UE having a DL buffer capacity (buffer capacity>0), and a UE to be updated may be different every subframe. For example, the eNB 1 510 updates the DL FP throughput of an active UE. If a DL buffer capacity to which a UE$^i$ may transmit data is present in a corresponding subframe, assuming that the amount of data allocated to a UE$^i$ is R$_i$, the DL FP throughput Tput$_i$ is updated according to IIR-filtering as in Equation 1 below. In Equation 1, the left side of an arrow means the updated throughput.

$$Tput_i \leftarrow \left(1 - \frac{1}{W}\right)Tput_i + \frac{1}{W}R_i \qquad \text{Equation 1}$$

In Equation 1, W is a value previously set as an IIR filtering window size. The DL FP throughput Tput$_i$ of a UE not having a DL buffer capacity to which data will be transmitted in a corresponding subframe is not updated. If the DL FP throughput Tput$_i$ is not updated, the DL FP may be processed like Equation 2 because there is no change in the DL FP throughput of the UE. In Equation 2, the left side of an arrow means the updated throughput.

$$Tput_i \leftarrow Tput_i \qquad \text{Equation 2}$$

The eNB 1 510 may manage an active UE list and DL FP throughput as described above. Furthermore, the eNB 1 510 may receive channel information from the UE.

At operation 560, the eNB 1 510 may generate information for transmission control. The information for transmission control is as follows.

An active UE list

The identifier (ID) and DL FP throughput of an active UE

Channel information of an active UE (channel quality information, such as a channel quality indicator (CQI), or link quality information, such as reference signal received power (RSRP)/uplink sounding reference signal (UL SRS) received power)

Each of the pieces of information may be generated depending on the properties of each of the pieces of information. The eNB 1 510 may collect an active UE list and the DL FP throughput and channel information of an active UE depending on whether a period set with each of each of the pieces of information or information received from a UE is present or not, and may generate information for transmission control to be reported to the central management apparatus 530.

At operation 563, an eNB 2 520 may generate information for transmission control to be reported to the central management apparatus 530 using the same method as that of the eNB 1 510.

At operation 566, the eNB 1 510 may transmit the information for transmission control to the central management apparatus. The information for transmission control may be transmitted in a predetermined period. The information for transmission control, including an active UE list, DL FP throughput and channel information, may be transmitted, and the pieces of information may be individually transmitted. For example, an active UE list report, a DL FP throughput report and a channel information report may be individually performed.

At operation 569, the eNB 2 520 may transmit the information for transmission control to the central management apparatus. A method of reporting the information is the same as that described with reference to the eNB 1 510.

The format, period, transmission method and message format of the information transmitted by the eNB 1 510 and the eNB 2 520 may be previously configured by the central management apparatus.

At operation 575, the central management apparatus 530 may determine transmission power and a transmission point. The central management apparatus 530 may determine the transmission power and/or the transmission point based on the information for transmission control received from the eNB 1 510 and the eNB 2 520.

The central management apparatus 530 may determine data transmission power of all of transmission points and data transmission points for all of UEs managed by the central management apparatus using the information collected from the eNBs 510 and 520. The central management apparatus 530 may determine the data transmission power and the transmission point so that the UE perceived throughput performance metrics of the UE is maximized. A detailed determination method is described below with reference to FIG. 7.

Figure 7:
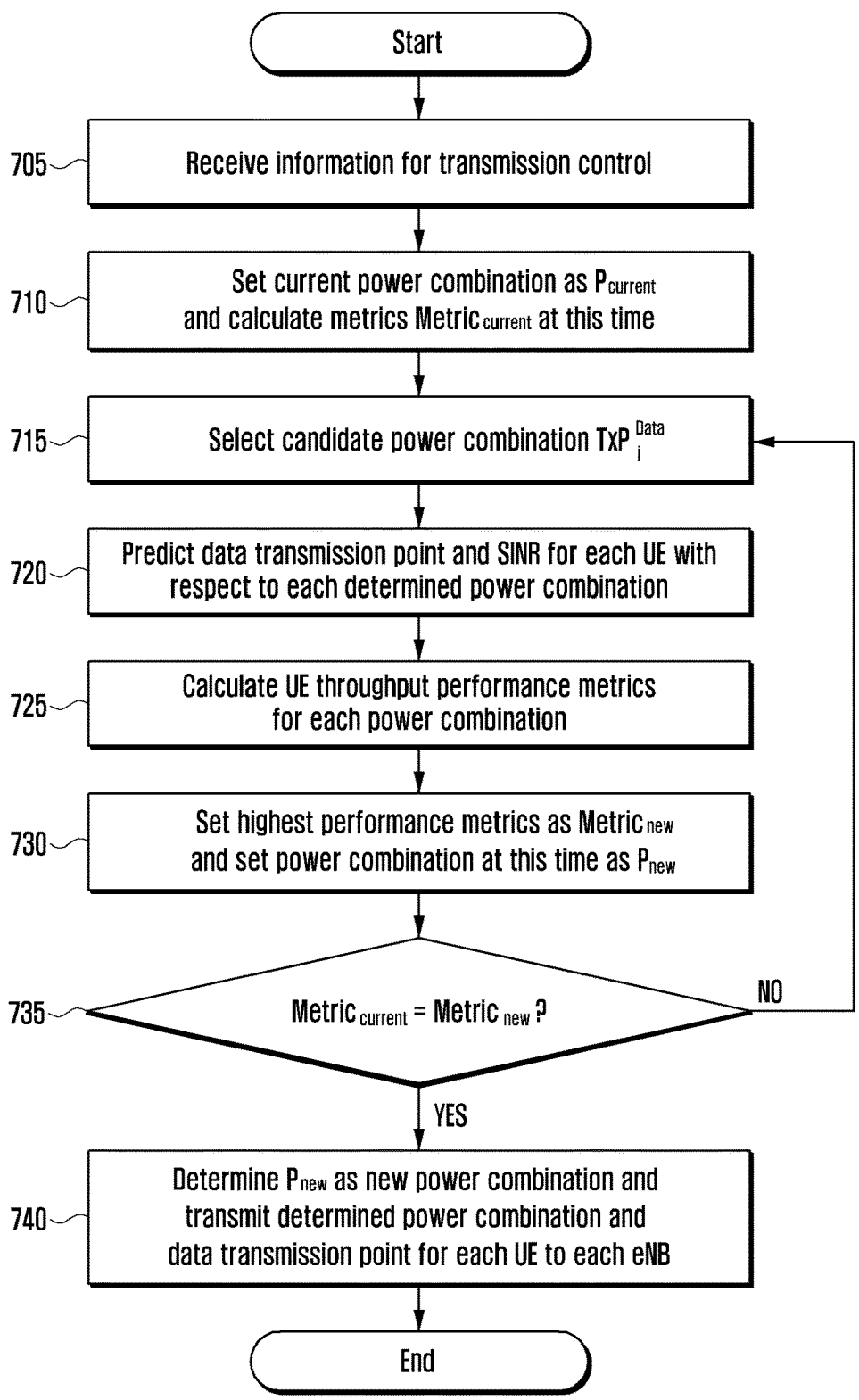
FIG. 7 is a diagram illustrating an operation of a central management apparatus according to an embodiment of the present disclosure.

FIG. 7 is a diagram illustrating an operation of a central management apparatus according to an embodiment of the present disclosure.

Referring to FIG. 7, at operation 705, the central management apparatus may receive information for transmission control from an eNB. The information for transmission control may include information about an active UE list, channel information and DL FP throughput.

After receiving the information from the eNB, the central management apparatus determines data transmission power and a data transmission point. An algorithm for determining the data transmission power and the data transmission point may be performed in a predetermined period.

At operation 710, the central management apparatus sets a power combination of active UEs of the eNB now controlled by the central management apparatus as "$P_{current}$." At this time, the central management apparatus determines metrics $Metric_{current}$.

At operation 715 to operation 735, the central management apparatus predicts a data transmission point and signal-to-interference-plus-noise-ratio (SINR) for each UE with respect to several power combinations, and calculates UE throughput performance metrics based on the data transmission point and SINR according to the following method.

At operation 715, the central management apparatus determines a power combination candidate group. For example, the central management apparatus may set power TxP1 in an eNB 1, power TxP2 in an eNB 2, and power TxP3 in an eNB 3.

At operation 720, the central management apparatus predicts a data transmission point and SINR for each UE with respect to the determined power combination. Assuming that data transmission power of a cell$_j$ is $TxP_j^{data}$, cell-specific reference signal transmission power (e.g., a common reference signal (CRS) in LTE) is $TxP_j^{CRS}$, and received power feedback in a UE$^i$ for a cell-specific reference signal transmitted by the cell$_j$ is $RxP_{i,j}$, the data transmission point and SINR of the UE$^i$ are predicted as follows.

The data transmission point DP(i) of the UE$^i$ may be determined as in Equation 3 below.

$$DP(i) = \frac{\underset{j}{\mathrm{argmax}}\, RxP_{i,j} \cdot TxP_j^{data}}{TxP_j^{CRS}} \quad \text{Equation 3}$$

It is assumed that when a UE measures received power from each transmission point, the UE performs feedback based on reference signal output related to coverage of a cell regardless of a change in the transmission power of a data region, such as a CRS or channel state information-reference signal (CSI-RS) of LTE, or a CSI-RS of fifth generation (5G). The received feedback of the UE may be CRS/CSI-RS-based RSRP. An eNB may determine a data transmission point based on transmission power of a cell and the received power feedback value of a UE.

If an UL SRS is used, received power of a UE is calculated using UL SRS power $SrsRxP_{i,j}$ received from each transmission point as in Equation 4 below.

$$RxP_{i,j} = SrsRxP_{i,j} \cdot TxP_j^{CRS} \quad \text{Equation 4}$$

After a data transmission point for all of UEs is determined as described above, the number of UEs that receive data from the cell, may be predicted as in Equation 5 below.

$$N_j = |\{i \mid DP(i) = j\}| \quad \text{Equation 5}$$

$$SINR_{i,j} = \quad \text{Equation 6}$$

$$\frac{RxP_{i,j} \cdot TxP_j^{data} / TxP_j^{CRS}}{\sum_{j' \neq j} RxP_{i,j'} \cdot TxP_{j'}^{data} \cdot (1 - CrsOverlapRatio_{j,j'})}$$

$$I_{N_{j'}>0} / TxP_j^{CRS} + \sum_{j' \neq j} RxP_{i,j'} \cdot CrsOverlapRatio_{j,j'} + NI_i$$

In Equations 5 and 6, $I_{N_{j'}>0}$ is a function having a value of 1 if $N_{j'}>0$ and having a value of 0 if not. NI is an estimated value of the sum of an interference signal and thermal noise from a cell not having SRS reception information of a corresponding UE. $CrsOverlapRatio_{j,j'}$ means the ratio of a region that belongs to the PDSCH region of the cell$_j$ and in which the CRS of a cell j' acts as interference. $CrsOverlapRatio_{j,j'}=0 \ \forall j,j'$ in an environment in which all of cells transmit CRSs at the same resource element (RE) location.

The transmission point and the SINR may be predicted as described above.

At operation 725, the central management apparatus calculates UE throughput performance metrics for each power combination using the results of operation 720.

Assuming that UEs have evenly used resources, the amount of data allocated to each UE in each subframe may be simplified as in Equation 7 below using the number of data transmission UEs for each cell and the SINR of each UE which have been calculated through the above process.

$$R_i = \frac{C(SINR_{i,DP(i)})}{N_{DP(i)}} \quad \text{Equation 7}$$

In Equation 7, C(SINR) means a capacity corresponding to a given SINR.

A DL FP throughput prediction value after time T, that is, the period in which the present method is performed, may be calculated as in Equation 8 below, using the calculated amount of data allocated to each UE in each subframe.

$$ExpectedTput_i = \left(1 - \frac{1}{W}\right)^T Tput_i + \left(1 - \left(1 - \frac{1}{W}\right)^T\right) R_i \quad \text{Equation 8}$$

The UE throughput performance metrics applied to an embodiment of the present disclosure are defined as in Equation 9 below using the calculated DL FP throughput prediction value.

$$\text{Metric}_{\{TxP_j\}} = \sum_{i=1}^{NumTotUE} \log(ExpectedTput_i) \quad \text{Equation 9}$$

In Equation 9, NumTotUE means a total number of users of the active UE list of all of cells. The metrics are used to calculate efficiency of a system through the log sum of DL FP throughputs. Efficiency of the system may be better because the value of the metrics is high as the sum of throughputs increases. Accordingly, it may be considered that the sum of throughputs is great if the value of the metrics is high and efficiency of the system is better if the sum of throughputs is great.

At operation 730, the central management apparatus sets the highest performance metrics in each power combination as new metrics, and sets the power combination as $P_{new}$.

At operation 735, the central management apparatus compares $\text{Metric}_{current}$ with $\text{Metric}_{new}$. If $\text{Metric}_{current}$ is greater than $\text{Metric}_{new}$, the central management apparatus proceeds to operation 740. If $\text{Metric}_{current}$ is not greater than $\text{Metric}_{new}$, the central management apparatus returns to operation 715 and repeats the operation of calculating new metrics. If $\text{Metric}_{current}$ is identical with $\text{Metric}_{new}$, current metrics are the best. In this case, the central management apparatus stops calculating metrics and proceeds to operation 740.

At operation 740, the central management apparatus may determine $P_{new}$ to be a new power combination, and may transmit the determined power combination and a data transmission point for each UE to each eNB.

The central management apparatus transmits the following information to each eNB after determining data transmission power for all of transmission points and a data transmission point for all of UEs described above.

Data transmission power $$TxP_j^{data}$$

to be used in a corresponding eNB

ID, DL FP throughput $Tput_i$, predicted channel quality and information (information, such as $SINR_{i,j}$, $NI_i$, $C(SINR_{i,j})$) necessary for an achievable data rate of UEs to which data will be transmitted by a corresponding eNB Referring back to FIG. 5, at operation 577, the central management apparatus 530 transmits information about the determined transmission power and transmission point to the eNB 1 510 as described above at operation 740 of FIG. 7. The transmission power is power used for a corresponding eNB to transmit data to the UE. The transmission point is a list of UEs to which data will be transmitted by a corresponding eNB. Furthermore, the information about the transmission power and transmission point may include scheduling information about a point of time at which data is transmitted to each UE.

At operation 579, the central management apparatus 530 transmits the information about the determined transmission power and transmission point to the eNB 2 520.

At operation 581, the eNB 1 510 may adjust transmission power based on the information received from the central management apparatus 530.

At operation 583, the eNB 2 520 may adjust transmission power based on the information received from the central management apparatus 530.

Specifically, the eNB 1 510 and the eNB 2 520 may perform the following eNB operation.

First, the eNB 1 510 may adjust transmission power based on the information received from the central management apparatus 530. When an eNB receives information about data transmission power and UEs that have to transmit data in a corresponding cell from the central management apparatus 530, the eNB adjusts transmission power for transmitting data based on the received information and schedules the corresponding UEs. Data transmission power and a reference signal (e.g., a demodulation reference signal (DMRS) of LTE and 5G) for demodulation use the same output, and the eNB does not adjust transmission power for a CRS and CSI-RS that influence cell coverage and channel quality feedback. For example, the eNB 1 510 adjusts transmission power for data transmission and a DMRS based on the information received from the central management apparatus 530, and maintains transmission power for transmitting a CRS and CSI-RS.

The eNB 1 510 manages an active UE list based on the information received from the central management apparatus 530. The eNB 1 510 may update the active UE list based on the information received from the central management apparatus 530. The eNB 1 510 updates a currently managed active UE list with an active UE list received from the central management apparatus 530. In this case, a UE newly added to the active UE list for T time is included in the active UE list.

An eNB may change buffer data according to a change in the transmission point of a UE.

In a technology of the related art, if a $UE^i$, that is, an active UE of a cell $j_1$, becomes an active UE of a cell $j_2$ due to the results of the "method of adjusting data transmission power and transmission point" in the central management apparatus 530, an eNB that manages the cell $j_1$ transmits the buffer data of the $UE^i$ to an eNB that manages the cell $j_2$. For example, if the eNB 1 510 serves UEs 1 and 2 and the eNB 2 520 serves UEs 3, 4 and 5 before they receive information about a transmission point from the central management apparatus 530, but the UE 3 has been determined to be served by the eNB 1 510 due to a change in the transmission point, buffer data needs to be changed in response to a change in the transmission point. For example, information about the UE 3 stored in the buffer of the eNB 2 520 needs to be provided to the eNB 1 510.

Furthermore, the eNB 1 510 schedules a UE based on the information received from the central management apparatus 530. The eNB 1 510 performs scheduling on a UE included in the active UE list.

The amount of data transmitted to each UE is predicted based on the SINR of the corresponding UE. An $SINR_{i,j}$ received from the central management apparatus 530 is used as the SINR of the UE. Alternatively, if whether scheduling will be performed in a corresponding subframe in a different cell is known, an SINR expected as in Equation 10 below is calculated again.

$$SINR_{i,j} = \frac{RxP_{i,j} \cdot TxP_j^{data} / TxP_j^{CRS}}{\sum_{j' \neq j} RxP_{i,j'} \cdot TxP_{j'}^{data} \cdot (1 - CrsOverlapRatio_{j,j'})} \qquad \text{Equation 10}$$

$$I_{Sch(j')} / TxP_j^{CRS} + \sum_{j' \neq j} RxP_{i,j'} \cdot CrsOverlapRatio_{j,j'} + NI_i$$

In Equation 10, $I_{Sch(j')}$ is a function that has a value of 1 if scheduling is performed on a corresponding subframe of a cell j' and that has a value of 0 if not.

Figure 8:
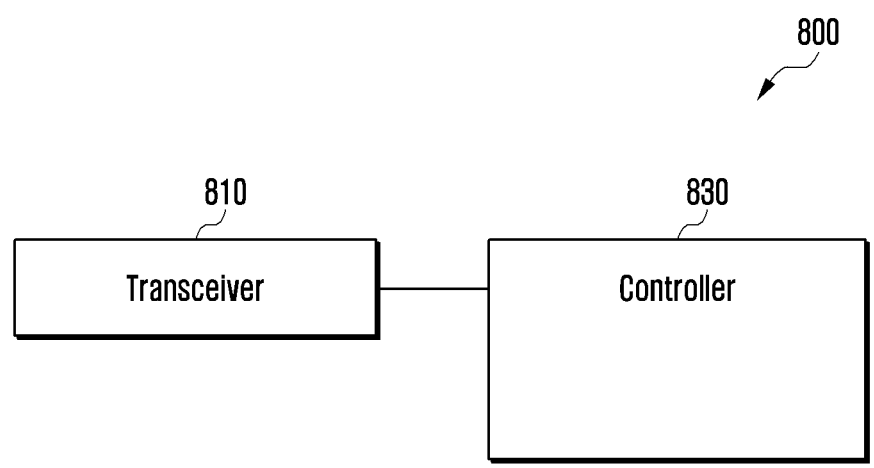
FIG. 8 is a diagram illustrating a central management apparatus according to an embodiment of the present disclosure.

FIG. 8 is a diagram illustrating a central management apparatus according to an embodiment of the present disclosure.

Referring to FIG. 8, a central management apparatus 800 may include a transceiver 810 and a controller 830. The controller 830 may include at least one processor. The controller 830 may control the operation of the central management apparatus 800. The transceiver 810 may transmit a signal, data (or information), and the like, to another entity and receive a signal, data (or information), and the like, from another entity.

The controller 830 may perform control so that transmission control-related information is received from an eNB, transmission power of at least one eNB and the transmission point of a UE are determined based on the transmission control-related information, and information about the determined transmission power and the transmission point of the UE are transmitted to the at least one eNB.

The transmission control-related information may include an active UE list, DL FP throughput and channel information of an active UE. Furthermore, the active UE is in the RRC connected state with the at least one eNB, and may include a UE that had a DL buffer capacity within a data collection period.

Furthermore, the controller 830 may maintain transmission power for the cell-specific reference signal (CRS) and channel state information-reference signal (CSI-RS) of the at least one eNB without any change, and may adjust transmission power for data.

Furthermore, the controller 830 may perform control so that a candidate power combination is determined based on the transmission control-related information, a transmission point for the candidate power combination and a SINR are determined, predicted throughput is determined based on the determined transmission point and SINR, and a combination belonging to candidate power combination and having the highest performance of predicted throughput is determined based on the predicted throughput.

The controller 830 may control the operations of the central management apparatus according to the embodiments of the present disclosure described with reference to FIGS. 4 to 7 in addition to the operation described with reference to FIG. 8.

Figure 9:
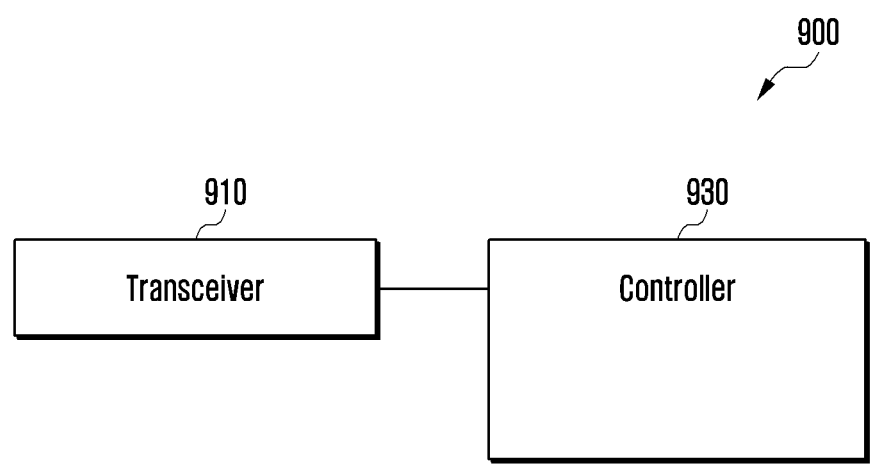
FIG. 9 is a diagram illustrating an eNB according to an embodiment of the present disclosure.

FIG. 9 is a diagram illustrating an eNB according to an embodiment of the present disclosure.

Referring to FIG. 9, an eNB 900 may include a transceiver 910 and a controller 930. The controller 930 may include at least one processor. The controller 930 may control the operation of the eNB 900. The transceiver 910 may transmit a signal, data (or information), and the like, to another entity and receive a signal, data (or information), and the like, from another entity.

The controller 930 may perform control so that transmission control-related information is collected, the collected transmission control-related information is transmitted to the central management apparatus, information about transmission power and information about a transmission point are received from the central management apparatus, transmission power for data is determined based on the received information about transmission power, and a serving UE is determined based on the information about the transmission point.

The transmission control-related information may include an active UE list, DL FP throughput and channel information of an active UE. Furthermore, the active UE is in the RRC connected state with the at least one eNB, and may include a UE that had a DL buffer capacity within a data collection period.

Furthermore, the controller 930 may perform control so that transmission power for a CRS and CSI-RS is maintained without any change and transmission power for data is adjusted based on the information about transmission power.

Furthermore, the controller 930 may perform control so that an active UE list is received from the central management apparatus. The active UE list received from the central management apparatus may have precedence over an active UE list generated by an eNB.

Furthermore, if the active list generated by the eNB and the active UE list received from the central management apparatus are different, the controller 930 may perform control so that information about the buffer of a changed active UE is exchanged with another eNB related to the changed active UE.

The controller 930 may control the operations of the eNB according to the embodiments of the present disclosure described with reference to FIGS. 1 to 7 in addition to the operation described with reference to FIG. 9.

As described above, in an embodiment of the present disclosure, real-time data transmission power and data transmission point can be adjusted in the state in which transmission power for a CRS and CSI-RS and a serving cell have been fixed. Accordingly, there is an effect in that real-time UE throughput performance in a commercial network can be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A transmission control method of a central management apparatus, the method comprising:
    receiving, by the central management apparatus, transmission control-related information from at least one base station;
    determining, by the central management apparatus, transmission power of the at least one base station and a transmission point for a terminal based on the transmission control-related information, wherein the transmission power for a reference signal is determined to be maintained without any change and the transmission power for data is determined to be adjusted, and the transmission point indicates which of the at least one base station transmits the data to the terminal; and
    transmitting, by the central management apparatus, information on the determined transmission power for the data and the transmission point to the at least one base station.

2. The method of claim 1, wherein the transmission control-related information includes an active terminal list, downlink filtered perceived (DL FP) throughput and channel information of an active terminal.

3. The method of claim 2, wherein the active terminal includes a terminal which has a radio resource control (RRC) connected state with the at least one base station and a downlink buffer capacity within a data collection period.

4. The method of claim 1, wherein the determining of the transmission power of the at least one base station and the transmission point for the terminal includes:
    determining a candidate power combination based on the transmission control-related information;
    determining the transmission point for the candidate power combination and signal-to-interference-plus-noise-ratio (SINR);
    determining predicted throughput based on the determined transmission point and SINR; and
    determining a combination belonging to the candidate power combination and having highest performance of the predicted throughput based on the predicted throughput.

5. A central management apparatus comprising:
    a transceiver configured to transmit and receive signals; and
    at least one processor coupled to the transceiver and configured to:
        control the transceiver to receive transmission control-related information from at least one base station,
        determine transmission power of the at least one base station and a transmission point for a terminal based on the transmission control-related information, wherein the transmission power for a reference signal is determined to be maintained without any change and the transmission power for data is determined to be adjusted, and the transmission point indicates which of the at least one base station transmits the data to the terminal, and
        control the transceiver to transmit information on the determined transmission power for the data and the transmission point to the at least one base station.

6. The central management apparatus of claim 5, wherein the transmission control-related information includes an active terminal list, downlink filtered perceived (DL FP) throughput and channel information of an active terminal.

7. The central management apparatus of claim 6, wherein the active terminal includes a terminal which has a radio resource control (RRC) connected state with the at least one base station and a downlink buffer capacity within a data collection period.

8. The central management apparatus of claim 5, wherein the at least one processor is further configured to:
    determine a candidate power combination based on the transmission control-related information,
        determine the transmission point for the candidate power combination and signal-to-interference-plus-noise-ratio (SINR),
        determine predicted throughput based on the determined transmission point and SINR, and
        determine a combination belonging to the candidate power combination and having highest performance of the predicted throughput based on the predicted throughput.

9. A method for a base station to adjust transmission power, the method comprising:
    collecting, by the base station, transmission control-related information;
    transmitting, by the base station, the collected transmission control-related information to a central management apparatus;
    receiving, by the base station, information on the transmission power for data and information on a transmission point from the central management apparatus; and
    determining, by the base station, to maintain the transmission power for a reference signal without any change and to adjust the transmission power for the data based on the received information on the transmission power,. and determining a serving terminal based on the received information on the transmission point.

10. The method of claim 9, wherein the transmission control-related information includes an active terminal list, downlink filtered perceived (DL FP) throughput and channel information of an active terminal.

11. The method of claim 9, further comprising receiving an active terminal list from the central management apparatus, wherein the active terminal list received from the central management apparatus has precedence over an active terminal list generated by the base station.

12. The method of claim 11, further comprising exchanging information on a buffer of a changed active terminal with another base station related to the changed active terminal, if the active terminal list generated by the base station and the active terminal list received from the central management apparatus are different.

13. A base station comprising:
    a transceiver configured to transmit and receive signals; and
    at least one processor coupled to the transceiver and configured:
        collect transmission control-related information,
        control the transceiver to transmit the collected transmission control-related information to a central management apparatus,
        control the transceiver to receive information on transmission power for data and information on a transmission point from the central management apparatus,
        determine to maintain the transmission power for a reference signal without any change and to adjust the transmission power for the data based on the received information on the transmission power, and determine a serving terminal based on the received information on the transmission point.

14. The base station of claim 13, wherein the transmission control-related information includes an active terminal list, downlink filtered perceived (DL FP) throughput and channel information of an active terminal.

15. The base station of claim 13,
wherein the at least one processor is further configured to control to transceiver to receive an active terminal list from the central management apparatus, and
wherein the active terminal list received from the central management apparatus has precedence over an active terminal list generated by the base station.

16. The base station of claim 15, wherein the at least one processor is further configured to exchange information on a buffer of a changed active terminal with another base station related to the changed active terminal, if the active terminal list generated by the base station and the active terminal list received from the central management apparatus are different.

\* \* \* \* \*